United States Patent [19]

Grossman

[11] 4,055,950
[45] Nov. 1, 1977

[54] ENERGY CONVERSION SYSTEM USING WINDMILL

[76] Inventor: William C. Grossman, 4274 Briarwood Way, Palo Alto, Calif. 94303

[21] Appl. No.: 644,495

[22] Filed: Dec. 29, 1975

[51] Int. Cl.² .......................................... F16D 31/02
[52] U.S. Cl. ...................................... 60/398; 290/55; 417/334
[58] Field of Search ............... 60/398, 397, 403, 405, 60/486, 698; 290/53, 55; 91/4; 417/122, 334, 335, 400, 401; 74/34

[56] References Cited

U.S. PATENT DOCUMENTS

| 832,930 | 10/1906 | Strong | 417/122 |
|---|---|---|---|
| 1,035,431 | 8/1912 | Ericson | 60/398 X |
| 1,420,845 | 6/1922 | Johnston | 417/334 X |
| 2,454,058 | 11/1948 | Hays | 290/55 |
| 2,475,117 | 7/1949 | Weaver | 74/34 |
| 2,755,966 | 7/1956 | Lindars | 91/275 X |
| 2,896,542 | 7/1959 | Forghieri | 417/401 |
| 2,938,347 | 5/1960 | Sturgis | 60/DIG. 10 |
| 3,234,854 | 2/1966 | Aber | 91/4 |
| 3,815,473 | 6/1974 | Jones | 91/275 X |

FOREIGN PATENT DOCUMENTS

4,205 of 1880 United Kingdom ............ 60/370

Primary Examiner—William L. Freeh
Assistant Examiner—Edward Look
Attorney, Agent, or Firm—Townsend and Townsend

[57] ABSTRACT

A system for recovering the energy from atmospheric wind wherein a windmill operates a compressor for compressing air which is stored in one or more tanks. The compressed air is used to drive a prime mover coupled by gear means to an electrical generator or other work-producing apparatus. The prime mover is operated by hydraulic fluid responsive to the application of the compressed air to fluid tanks by valve means responsive to the operation of the prime mover. The compressor has a unique means for lubricating the same. Alternately, the prime mover can be operated by conventional water pressure during periods of little or no wind.

2 Claims, 4 Drawing Figures

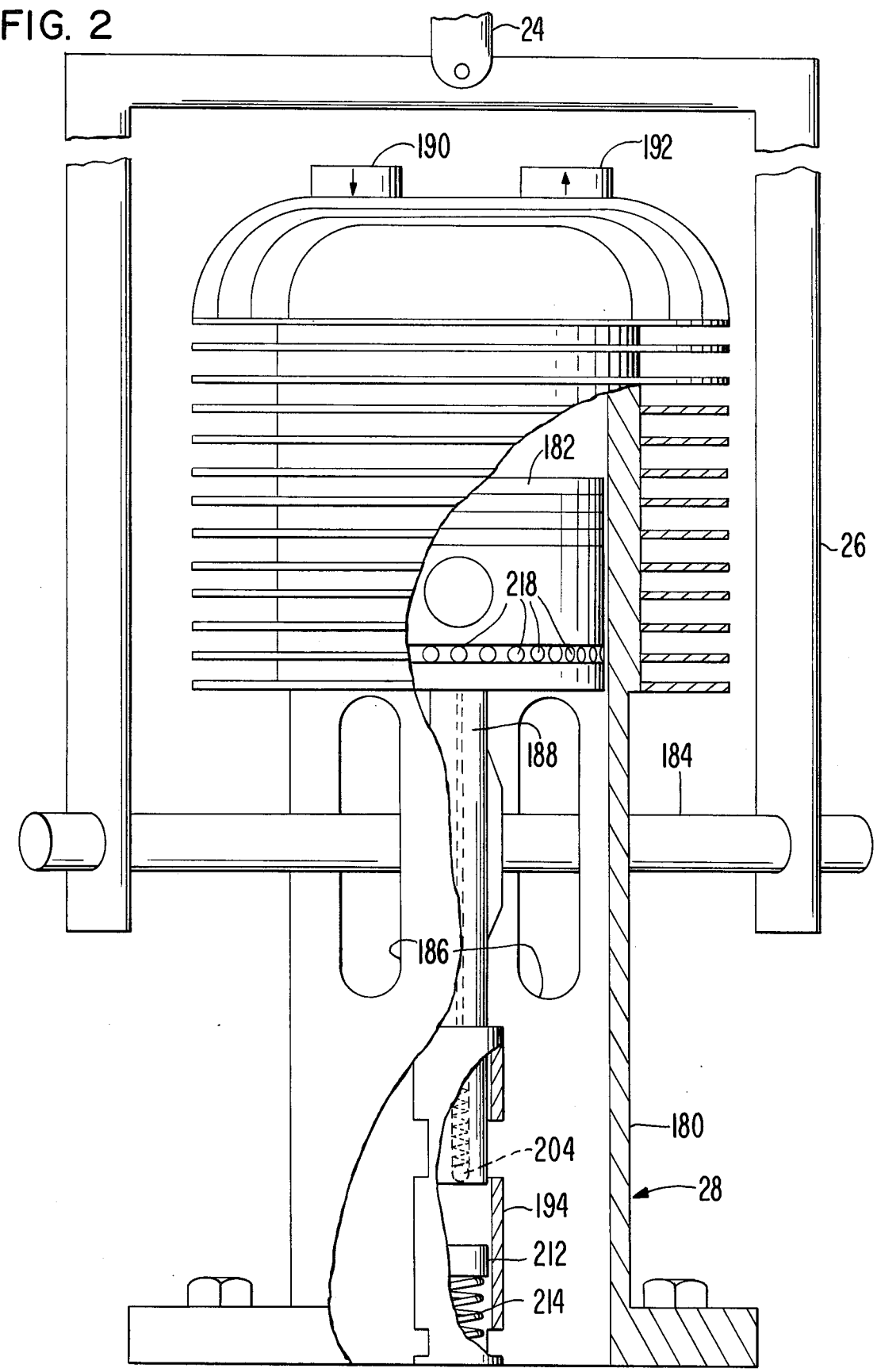

ENERGY CONVERSION SYSTEM USING WINDMILL

This invention relates to improvements in energy recovery systems and, more particularly, to a system for recovering energy of atmospheric winds.

BACKGROUND OF THE INVENTION

The practice of converting free wind energy to electrical energy is not new. Systems now in use present storage problems. To store sufficient electrical energy during no wind periods, a relatively large number of wet cell batteries are required and these batteries are quite expensive. Moreover, the efficiency of such batteries is affected by the environment in which they are placed and the energy from the batteries leaks or dissipates when they are in standby operation. The life of such wet cell batteries varies, depending upon their usage and maintenance. If wind has not blown for a long period of time and if the stored energy in the wet cell batteries has dissipated, the batteries will require a relatively long time to be charged again before a load can be placed across the batteries. Thus, serious limitations exist with respect to the storage of potential energy derived from atmospheric wind in wet cell batteries and a need has, therefore, arisen for an improved system which recovers energy from the wind for immediate use and is able to operate to store such energy for immediate use at any time. It also should utilize alternate means of energy in the event that there are periods of no wind and still the system is needed to produce work.

SUMMARY OF THE INVENTION

The present invention is directed to an energy recovery system and method which meets the aforesaid need. To this end, the system of the present invention operates to store energy derived from atmospheric wind as compressed air and to use the compressed air to drive a hydraulic motor for operating a prime mover coupled to a work-producing apparatus, such as an electrical generator. The compressed air can be stored indefinitely in tanks and can be called upon at any time for supplying the energy necessary to operate the prime mover.

The system also has an alternate means operable from conventional water pressure for operating the prime mover. Thus, during period of no wind, the water from a conventional water main can be directed along alternate paths to the prime mover for causing reciprocation thereof so that it can operate the work-producing apparatus on water pressure alone without having to rely upon compressed air which would possibly be depleted due to no wind periods or for other reasons.

The primary object of this invention is to provide an energy recovery system and method which permits recovery of energy from atmospheric wind or, in the alternative, to permit operation of a prime mover from standard water pressure to thereby avoid the need for extensive, massive storage batteries yet the system is operable at any time.

Another object of this invention is to provide a system of the type described wherein the atmospheric wind energy is stored as compressed air and used to drive a hydraulic motor coupled to a prime mover which in turn, when operated, operates a work-producing apparatus, such as an electrical generator, to provide electrical power recovered from the wind energy.

Still another object of this invention is to provide an improved air compressor for a system of the type described wherein the compressor has improved means for lubricating its friction surfaces to provide a long operating life without substantial maintenance.

Other objects of this invention will become apparent as the following specification progresses, reference being had to the accompanying drawings for an illustration of an embodiment of the system.

In the drawings:

FIG. 2 is an enlarged, side elevational view, partly broken away and in section, of an embodiment of an air compressor forming a part of the system of FIG. 1;

Figure 1:
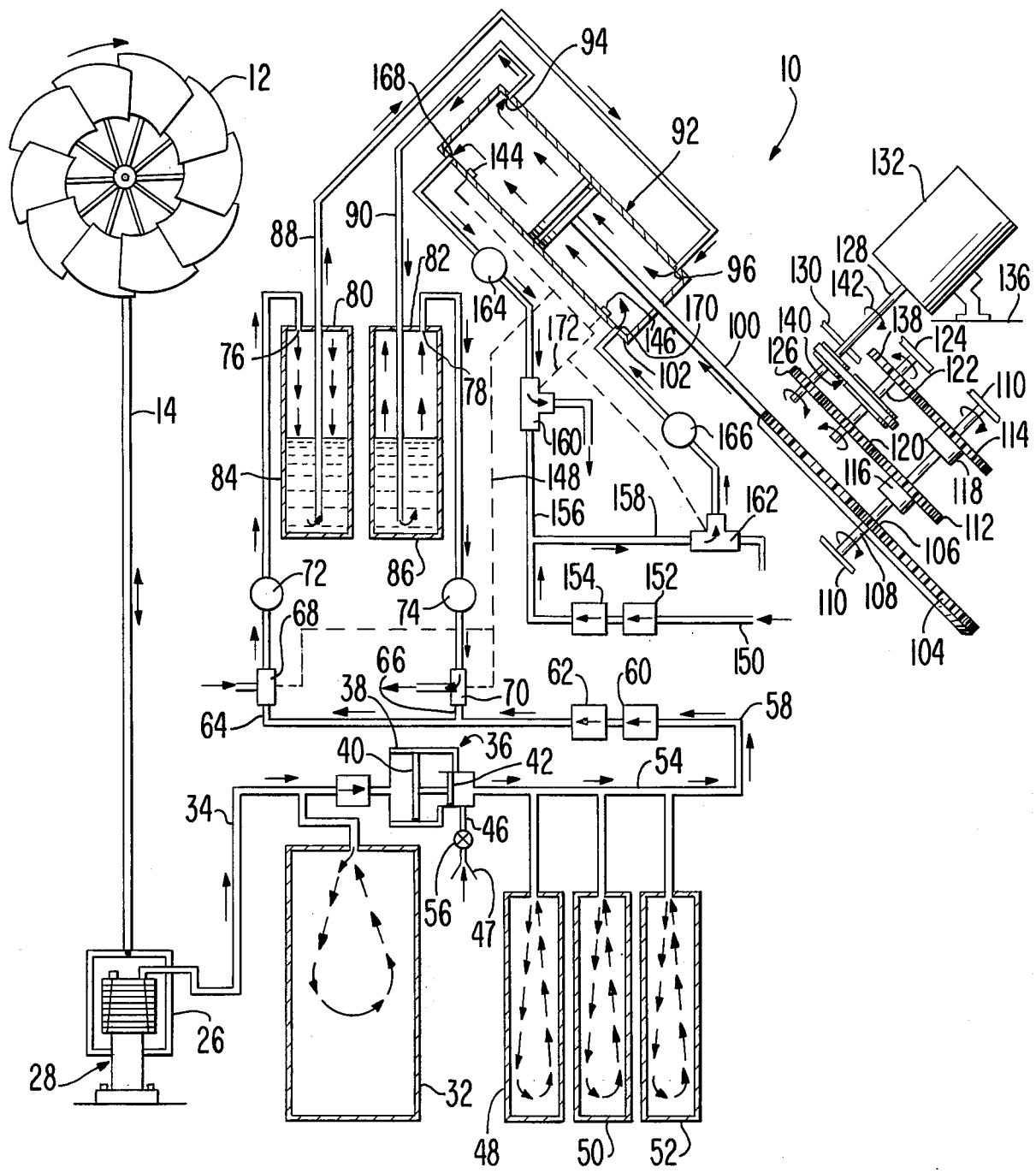
FIG. 1 is a schematic view of the energy recovery system of this invention illustrating compressed air tanks and power drive means responsive to the compressed air in the tanks for operating one form of work producing apparatus, such as an electrical generator.

The energy recovery system of this invention is broadly denoted by the numeral 10 and is shown schematically in FIG. 1. System 10 operates to recover energy from atmospheric wind which rotates a conventional windmill 12 having crank means (not shown) for reciprocating a rod 14 coupled at its lower end to a straddle bracket 26 of an air compressor 28 mounted on a surface 30. Thus, as rod 14 moves up and down due to the rotation of the windmill, straddle bracket 26 moves up and down and actuates air compressor 28.

Compressor 28 operates to compress air in response to the up and down movement of straddle bracket 26. This compressed air is directed into a storage tank 32 by way of tube 34. Tube 34 is also coupled to a fluid intensifier 36 or gas booster having a cylinder 38 provided with a first piston 40 in an enlarged part thereof and a second piston 42 in a reduced part thereof. A typical intensifier is one made by Haskell Engineering Company of San Fernando, California and known as a Haskell Gas Booster System. Intensifier 36 operates to compress air entering the reduced portion of cylinder 38 by way of tube 46 so that such compressed air is directed into three storage tanks 48, 50 and 52 by way of pipe 54. Air is compressed into these last-mentioned tanks when the air pressure in tank 32 reaches a predetermined value. Typically, air in tank 32 is compressed to a pressure of about 75 to 100 psi. When the pressure reaches the upper limit of this range in tank 32, the air pressure moves pistons 40 and 42 to the right when viewing FIG. 1 to compress air into tanks 48, 50 and 52. The air enters at inlet 47 and moves past a one-way check value 56. The intensifier 36 typically compresses the air in the range of 1800 to 2200 psi and stores it in tanks 48, 50 and 52.

A line 58 connects tanks 48, 50 and 52 to a pair of valves 60 and 62 in series with line 58. Valve 60 is an automatic start/stop valve and valve 62 is a pressure regulator valve. Line 58 branches into two additional lines 64 and 66 having respective three-way valves 68 and 70 therein. Manual on-off valves 72 and 74 are coupled, respectively, in lines 64 and 66. The latter lines are directed into inlets 76 and 78 in the tops 80 and 82 of a pair of conversion tanks 84 and 86 containing a liquid, such as water. These tanks provide the conversion from air pressure to hydraulic pressure as hereinafter described.

Tubes 88 and 90 extend into tanks 84 and 86 through tops 80 and 82 thereof and the lower ends of these tubes are near the bottoms of respective tanks. Tube 88 enters a cylinder 92 at one inlet 96 thereof. Tube 90 enters cylinder 92 at a second inlet 94 at the opposite end of the cylinder, the latter having a piston 98 and a piston rod 100 extending through one end wall 102 thereof. Cylinder 92 with piston 98 presents a prime mover for reciprocating a rack 104 connected to the outer end rod 100. The rack has a spur gear 106 in mesh therewith, the spur gear being mounted on a shaft 108 mounted in suitable bearings 110 for rotation in opposed directions as the rack reciprocates relative to spur gear 106.

A pair of larger spur gears 112 and 114 are mounted on shaft 108 by respective cam clutches 116 and 118. Each cam clutch will positively lock to transmit torque from shaft 108 to the corresponding gear only in one direction. Thus, gear 112 will be in driving relationship in one direction and gear 114 will be in driving relationship in the opposite direction. Each cam clutch will overrun freely in the opposite direction and its action can be compared to a self-contained rachet with an infinite number of teeth.

Gear 112 is in mesh with an idler gear 120 mounted on a shaft 122 rotatably carried by bearings 124. Gear 120 is in mesh with a spur gear 126 on a shaft 128 carried by bearings 130. Shaft 128 is the drive shaft for an electrical generator 132 mounted in any suitable manner, such as by a bracket 134 on a supporting surface 136.

Gear 114 is in mesh with a spur gear 138 on shaft 122 and a belt and pulley assembly 140 connects shaft 122 with shaft 128. Thus, when rack 104 moves in one direction, it rotates spur gear 106 which in turn causes rotation of one of the two gears 112 and 114 in the latter's driving direction. For instance, spur gear 112 is rotated to in turn transmit its rotation through gear 120 and gear 126 to cause rotation of shaft 128 in the direction of arrow 142 (FIG. 1). When the rack moves in the first-mentioned direction to rotate spur gear 112, the cam clutch 118 of spur gear 114 is overrunning so that gear 114 is not in driving relationship to gear 138. However, when the rack moves in the opposite direction, cam clutch 116 is overrunning, while gear 114 is in driving relationship to gear 138. This causes belt and pulley unit 140 to rotate shaft 128 in the direction of arrow 142. Thus, for continuated reciprocation of the rack, shaft 128 rotates continuously in the direction of arrow 142. This drives generator 132 so that electrical power can be derived therefrom.

Cylinder 92 is provided with suitable sensors 144 and 146 to sense the operative position of piston 98. The sensors can be magnetic, hydraulic or electrical and are coupled to three-way valves 68 and 70 for alternately operating the same to cause air pressure in tanks 84 and 86 to force the hydraulic liquid therefrom to cylinder 92. Dashed line 148 indicates the coupling between the sensors and valves 68 and 70.

The prime mover comprised of cylinder 92 and piston 98 can be operated on standard water pressure in the event that compressed air has been depleted in tanks 48, 50 and 52. To this end, water from a water main is directed along a line 150, past an automatic start/stop valve 152 and a pressure regulator valve 154. The water line branches into two lines 156 and 158 having three-way valves 160 and 162, respectively. Manual on-off valves 164 and 166 are also provided in lines 156 and 158 in series with valves 160 and 162 thereof.

Line 156 communicates with the interior of cylinder 92 at inlet 168. Line 158 communicates with the interior of cylinder 92 at inlet 170. Sensors 144 and 146 are coupled to valves 160 and 162, respectively, the coupling being denoted by dashed line 172. Using the standard water pressure, piston 98 can be caused to reciprocate and thereby effect reciprocation of rack 104 continually. This, in turn, will cause continuous rotation of shaft 128 of generator 132 so as to generate electrical power.

Compressor 28 can be of any desired construction. However, it is preferred that it be constructed in the manner shown in FIGS. 2–4 to assure proper lubrication at all times because it is possible that in a very light wind, the compressor will be travelling at a very low speed. Thus, good lubrication must be supplied for these slow speeds to prevent the compressor from breaking down due to wear.

Compressor 28 has a tubular housing 180 (FIG. 2) in which a piston 182 is disposed. Piston 182 reciprocates in housing 180 by virtue of a load shaft 184 connected to straddle bracket 26. Load shaft 184 extends through slots 186 in housing 180 and is directly connected to the piston rod 188 connected to piston 182. Slots 186 will be sealed to keep oil in and to keep dirt out of housing 180. An air inlet 190 and an air outlet 192 are provided at the upper end of housing 180. Tube 34 (FIG. 1) is connected to outlet 192. Appropriate check valves (not shown) are disposed in inlet 190 and outlet 192.

Figure 4:
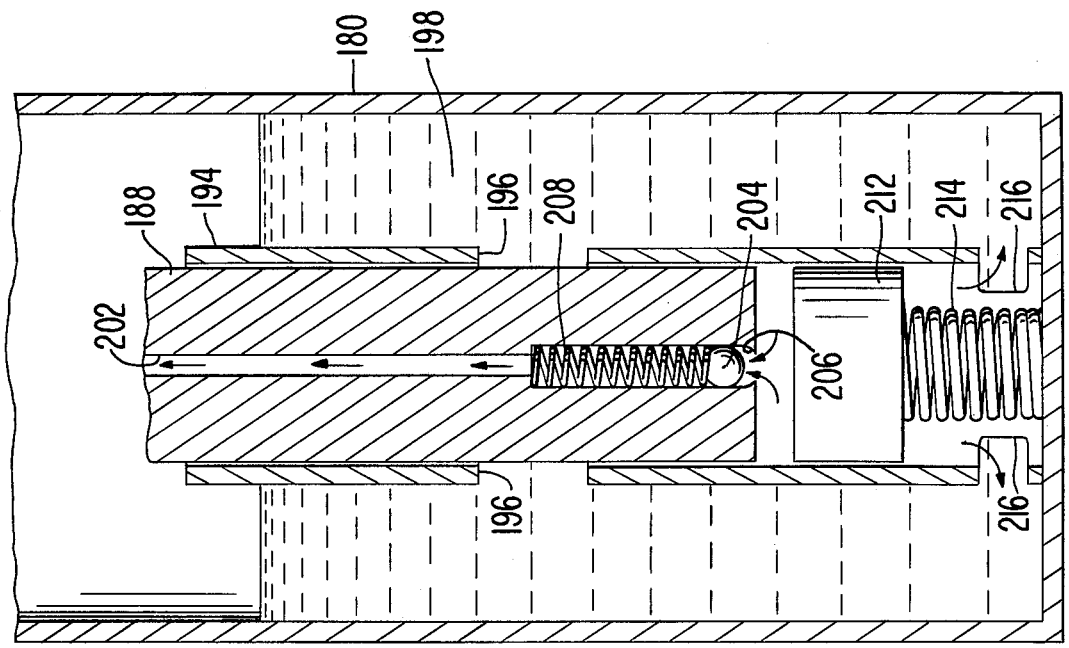
FIG. 4 is a view similar to FIG. 3 but showing the lubricating means in another operative position.
Figure 3:
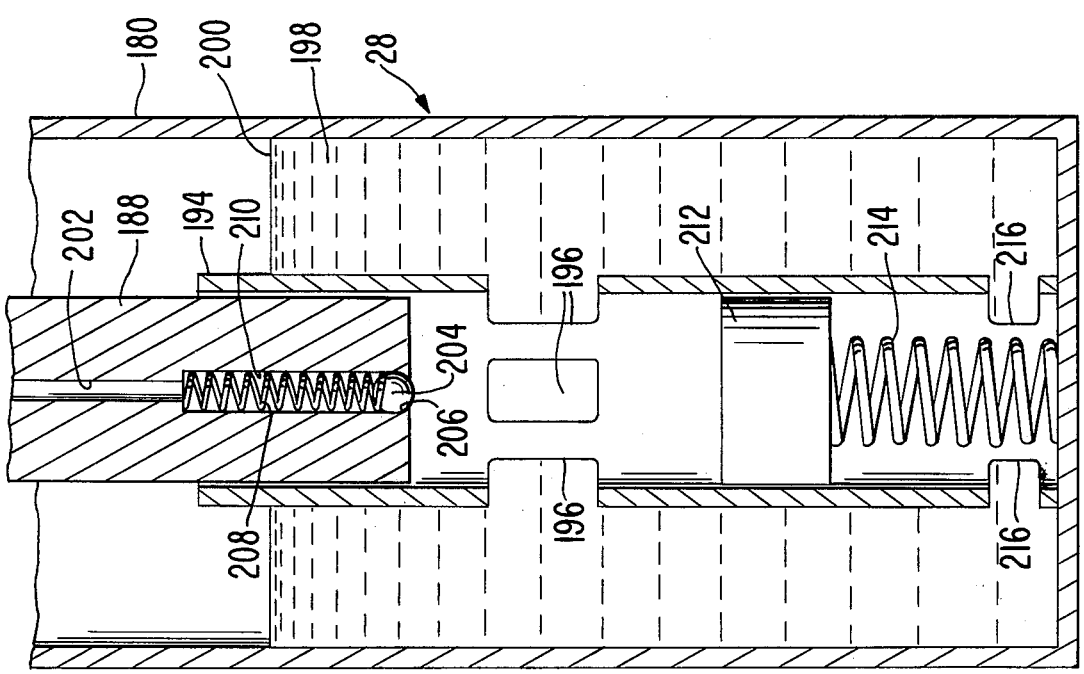
FIG. 3 is an enlarged, cross-sectional view of one portion of the air compressor showing the means by which the piston of the compressor is lubricated.

Piston rod 188 is shown in FIGS. 3 and 4 as being movable in a tubular mount 194 within housing 180. Mount 194 has slots 196 so that oil 198 to a level 220 can enter mount 194 and travel upwardly through a passage 202 in rod 188 when a ball check valve 204 is unseated from a valve seat 206 and a pressure is exerted on the oil. The ball check valve is held against seat 206 by a coil spring 208 in a countersunk portion 210 of passage 202.

A piston 212 in mount 194 below slots 196 is held biased upwardly by a coil spring 214 adjacent inlet slots 216 at the bottom of mount 194. Thus, when piston rod 188 is lowered due to downward travel of straddle bracket 26, the piston moves past slots 196 to trap oil between the lower face of rod 188 and the upper face of piston 212. When the trapped oil reaches a certain pressure, the oil pressure will overcome the bias force of spring 208 to open check valve 202, causing oil to rise through passage 202 and outwardly through ports 218 in the outer surface of piston 182 (FIG. 2) so that friction surfaces of the compressor will be properly lubricated. As piston 182 moves downwardly, air is drawn into housing 180 through inlet 190. As this occurs, the check valve in outlet 192 prevents air from being sucked into the housing from line 34. As piston 182 is forced upwardly, air is compressed and forced out of outlet 192 and into tube 34 and thereby into tank 32. During this portion of the cycle, the check valve in inlet 190 operates to prevent air being discharged through the inlet.

The system of the present invention is operated when wind flows and turns windmill 12. This causes vertical reciprocation of rod 14 and vertical reciprocation of straddle bracket 26. This motion of the straddle bracket causes load shaft 184 to raise and lower to, in turn, cause piston 182 of compressor 28 to reciprocate in housing 180. Air is drawn into the housing and compressed and directed into tank 32. When the air pressure in the tank reaches a predetermined value, air is further compressed by piston 42 of the intensifier and the compressed air is directed into tanks 48, 50 and 52. This occurs a number of times per hour so that intensifier 36 itself serves as a continually operating air compressor.

By proper manipulation of valves 60 and 62 of line 58, compressed air from tanks 48, 50 and 52 can be used to drive hydraulic fluid from tanks 84 and 86 into opposite ends of cylinder 92. For instance, when the compressed air is directed into line 64, the hydraulic fluid is directed out of tank 84 through tube 88 and enters inlet 96 of cylinder 92, forcing piston 98 toward inlet 94. This causes rack 104 to effect rotation of gear 112, for instance, which in turn causes rotation of shaft 128 in the direction of arrow 142. During this time, liquid is forced from the upper end of cylinder 92 by piston 98 through tube 90 and back into tank 86. The air from this tank is directed through line 66 to valve 70 where it is bled to the atmosphere.

On the next cycle, valve 68 is closed to compressed air and valve 70 is opened, causing compressed air to force the liquid in tank 86 to move upwardly through tube 90 and into cylinder 92 through inlet 94. This causes piston 98 to move downwardly and to force liquid out of the same through tube 88 back into tank 84. Air in this tank is then forced out of the same and through line 64 to valve 68 where it is bled to the atmosphere.

As piston 98 travels downwardly, it forces the rack in the opposite direction, causing rotation of gear 114 to in turn cause rotation of shaft 128 through belt and pulley assembly 140 in the direction of arrow 142, the same direction as caused by the movement of the rack upwardly instead of downwardly when viewing FIG. 1.

The foregoing operation continues so long as the valves are manipulated to effect a movement of piston 98 in cylinder 92. This causes continuous operation of generator 132 and continued generation of electrical power. When valve 60 is turned off, the compressed air remains in tanks 32, 48, 50 and 52 as stored potential energy. There is no leakage; thus, compressed air is immediately available at all times for use in operating the prime mover defined by cylinder 92 and piston 98.

In the alternative, water pressure can be used instead of compressed air to operate the prime mover. The water pressure from a water main is coupled to line 150 and valves 160 and 162 are responsive to sensors 144 and 146 to alternately open and close and bleed water to a receptacle or collector of some type.

During the operation of the windmill, the friction surfaces of piston 182 are continuously lubricated by the lubrication means shown in FIGS. 3 and 4. Thus, the compressor will have a long operating life.

I claim:

1. An energy transfer system comprising: a rotatable windmill responsive to atmospheric wind; an air compressor coupled to the windmill for compressing air as a function of the rotation thereof under the influence of atmospheric wind; means coupled with the compressor for storing air compressed thereby; a prime mover including a piston and cylinder assembly, said piston of the assembly having a control rod responsive to a fluid under pressure, there being a rack on the control rod, and structure coupled to the rack for connecting the same to a workproducing apparatus; a hydraulic motor having a pair of tanks containing a liquid, said tanks being coupled to said prime mover for supplying liquid thereto to thereby actuate said control rod and to maintain it in operation in response to a change in the level of the liquid in said tanks to thereby permit said prime mover to operate said work-producing apparatus, said storing means being in fluid communication with said tanks to supply compressed air thereto for changing said liquid level therein; and a valve responsive to the operation of the prime mover for controlling the flow of compressed air from said storing means into and out of each tank, respectively.

2. An energy transfer system comprising: a rotatable windmill responsive to atmospheric wind; an air compressor coupled to the windmill for compressing air as a function of the rotation thereof under the influence of atmospheric wind; a tank coupled with the compressor for storing air compressed thereto; an intensifier coupled to the tank for compressing air thereinto as a function of the operation of said air compressor; a prime mover having actuatable means responsive to hydraulic fluid under pressure for operating a work-producing apparatus; a hydraulic motor having tank means containing a hydraulic fluid, said tank means being coupled to said prime mover for supplying hydraulic fluid thereto to thereby actuate said operating means and to maintain it in operation in response to a change in the level of the hydraulic fluid in said tank means to thereby permit said operating means to operate a work-producing apparatus, said storing means being in fluid communication with said tank means to supply compressed air thereto for changing said hydraulic fluid level therein; and valve means responsive to the operation of the prime mover for controlling the flow of compressed air from said storing means to said tank means.

* * * * *